United States Patent
Pegg

(10) Patent No.: US 8,611,973 B2
(45) Date of Patent: Dec. 17, 2013

(54) SLIDABLE PORTABLE ELECTRONIC DEVICE WITH KEYPAD PORTION ADAPTED FOR COVERING DISPLAY

(75) Inventor: Albert Murray Pegg, Cambridge (CA)

(73) Assignee: Blackberry Limited, Waterloo, Ontario (CA)

( * ) Notice: Subject to any disclaimer, the term of this patent is extended or adjusted under 35 U.S.C. 154(b) by 42 days.

(21) Appl. No.: 13/041,779

(22) Filed: Mar. 7, 2011

(65) Prior Publication Data

US 2012/0231848 A1 Sep. 13, 2012

(51) Int. Cl.
*H04M 1/00* (2006.01)
(52) U.S. Cl.
USPC .................................. 455/575.4; 455/575.1
(58) Field of Classification Search
USPC ............................................ 455/575.1, 575.4
See application file for complete search history.

(56) References Cited

U.S. PATENT DOCUMENTS

| | | | |
|---|---|---|---|
| 6,748,249 B1* | 6/2004 | Eromaki et al. | 455/575.4 |
| 8,116,834 B2* | 2/2012 | Jang et al. | 455/575.4 |
| 8,332,001 B2* | 12/2012 | Guo | 455/575.4 |
| 8,428,663 B2* | 4/2013 | Sano et al. | 455/575.1 |
| 2003/0104850 A1* | 6/2003 | Lai et al. | 455/575 |
| 2004/0198477 A1* | 10/2004 | Jung et al. | 455/575.4 |
| 2005/0032557 A1* | 2/2005 | Brunstrom et al. | 455/575.1 |
| 2005/0052837 A1* | 3/2005 | Kota et al. | 361/683 |
| 2005/0233785 A1* | 10/2005 | Park et al. | 455/575.4 |
| 2006/0073859 A1* | 4/2006 | Chou | 455/575.4 |
| 2007/0042817 A1* | 2/2007 | Lin | 455/575.1 |
| 2007/0117599 A1 | 5/2007 | Kumar | |
| 2008/0032637 A1* | 2/2008 | Ladouceur et al. | 455/90.3 |
| 2010/0093409 A1* | 4/2010 | Jokinen et al. | 455/575.4 |
| 2010/0144408 A1* | 6/2010 | Chuang et al. | 455/575.4 |
| 2011/0053662 A1* | 3/2011 | Wei | 455/575.1 |
| 2011/0275422 A1* | 11/2011 | Kemppinen | 455/575.4 |

FOREIGN PATENT DOCUMENTS

| | | |
|---|---|---|
| EP | 1298909 | 4/2003 |
| EP | 1307030 | 5/2003 |
| EP | 1513323 | 3/2005 |
| JP | 2004235687 | 8/2004 |

OTHER PUBLICATIONS

Extended European Search Report for European Patent Application Serial No. 11157211.1, EESR dated Oct. 10, 2011, European Patent Office.

* cited by examiner

*Primary Examiner* — Charles Appiah
*Assistant Examiner* — Mazda Sabouri
(74) *Attorney, Agent, or Firm* — Bereskin & Parr LLP

(57) ABSTRACT

According to one aspect, there is provided a portable electronic device, including a first portion having a display, and a second portion slidably coupled to the first portion. The first portion and second portion are sized and shaped so that the second portion can move between a closed position, wherein a first region of the display is exposed and a second region of the display is covered by the second portion, and an open position wherein the first and second regions of the display are exposed. The first portion may be a display portion and the second portion may be a keypad portion having a keypad.

9 Claims, 9 Drawing Sheets

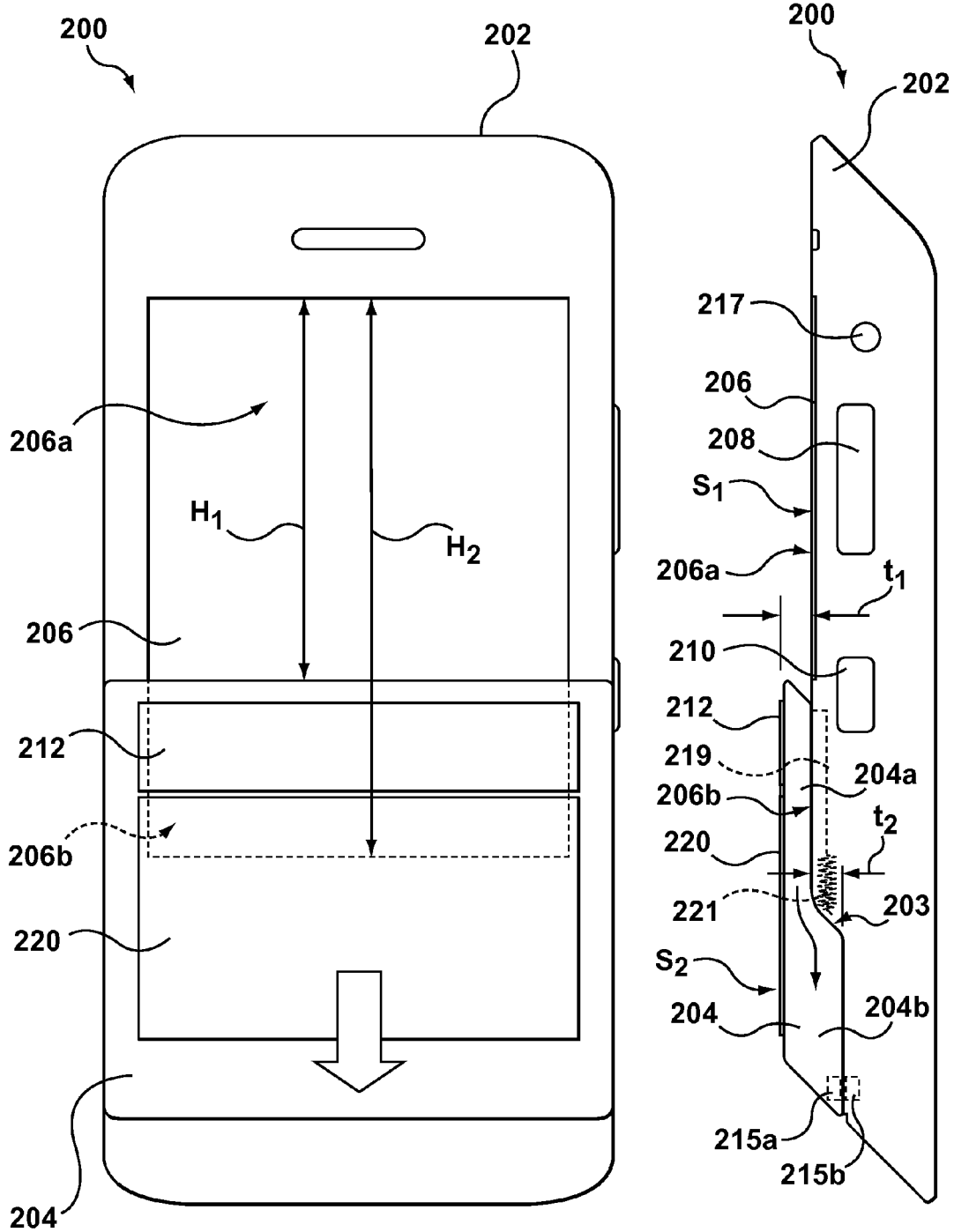

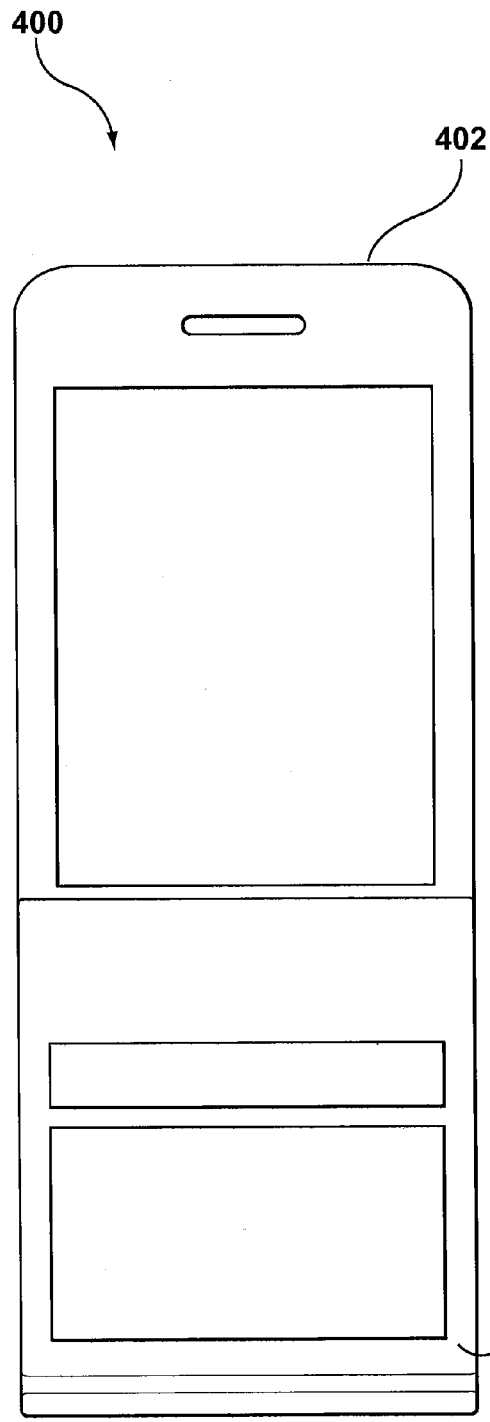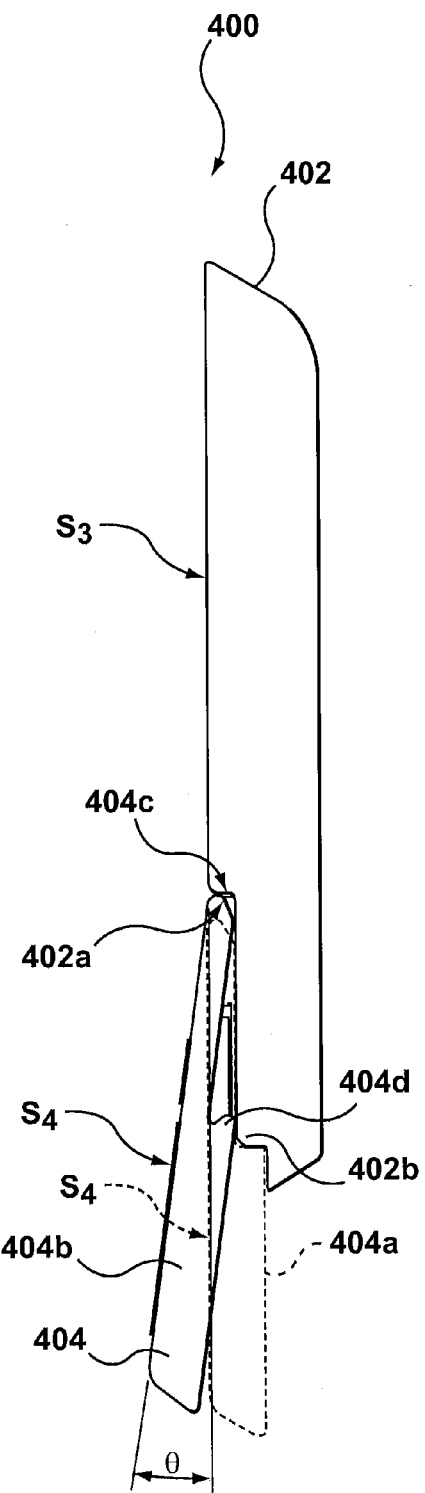
FIG. 12
FIG. 13

SLIDABLE PORTABLE ELECTRONIC DEVICE WITH KEYPAD PORTION ADAPTED FOR COVERING DISPLAY

FIELD

Embodiments herein relate to portable electronic devices, and more particularly to slidable portable electronic devices having a display portion and a keypad portion, the keypad portion being movable between a closed position and an open position.

INTRODUCTION

Electronic devices, including portable electronic devices, have gained widespread use and may provide a variety of functions including, for example, telephonic, electronic text messaging and other personal information manager (PIM) application functions. Portable electronic devices can include mobile stations such as cellular phones, smart phones, Personal Digital Assistants (PDAs), tablets and laptop computers.

Some handheld devices are touch-sensitive devices having a display, such as a liquid crystal display (LCD), with a touch-sensitive overlay. These touch sensitive devices may be useful, as handheld devices tend to be small and therefore limited in space available for user input and output devices. Further, these touch-sensitive devices allow a variety of input and output configurations, for example, because the screen content on the touch-sensitive devices may change depending on the functions and operations being performed.

Sometimes it may be desirable to have a second input device that is distinct from the touch sensitive display, and which may have a keypad or other input devices thereon.

BRIEF DESCRIPTION OF THE DRAWINGS

Embodiments of the present disclosure will now be described, by way of example only, with reference to the attached figures, wherein:

FIG. 2 is a front view of a portable electronic device according to one embodiment shown in a closed position;

FIG. 3 is a side view of the portable electronic device of FIG. 2 shown in the closed position;

FIG. 12 is a front view of the portable electronic device of FIG. 10 shown in an open position;

FIG. 13 is a side view of the portable electronic device of FIG. 10 shown in the open position;

DETAILED DESCRIPTION

Figure 1:
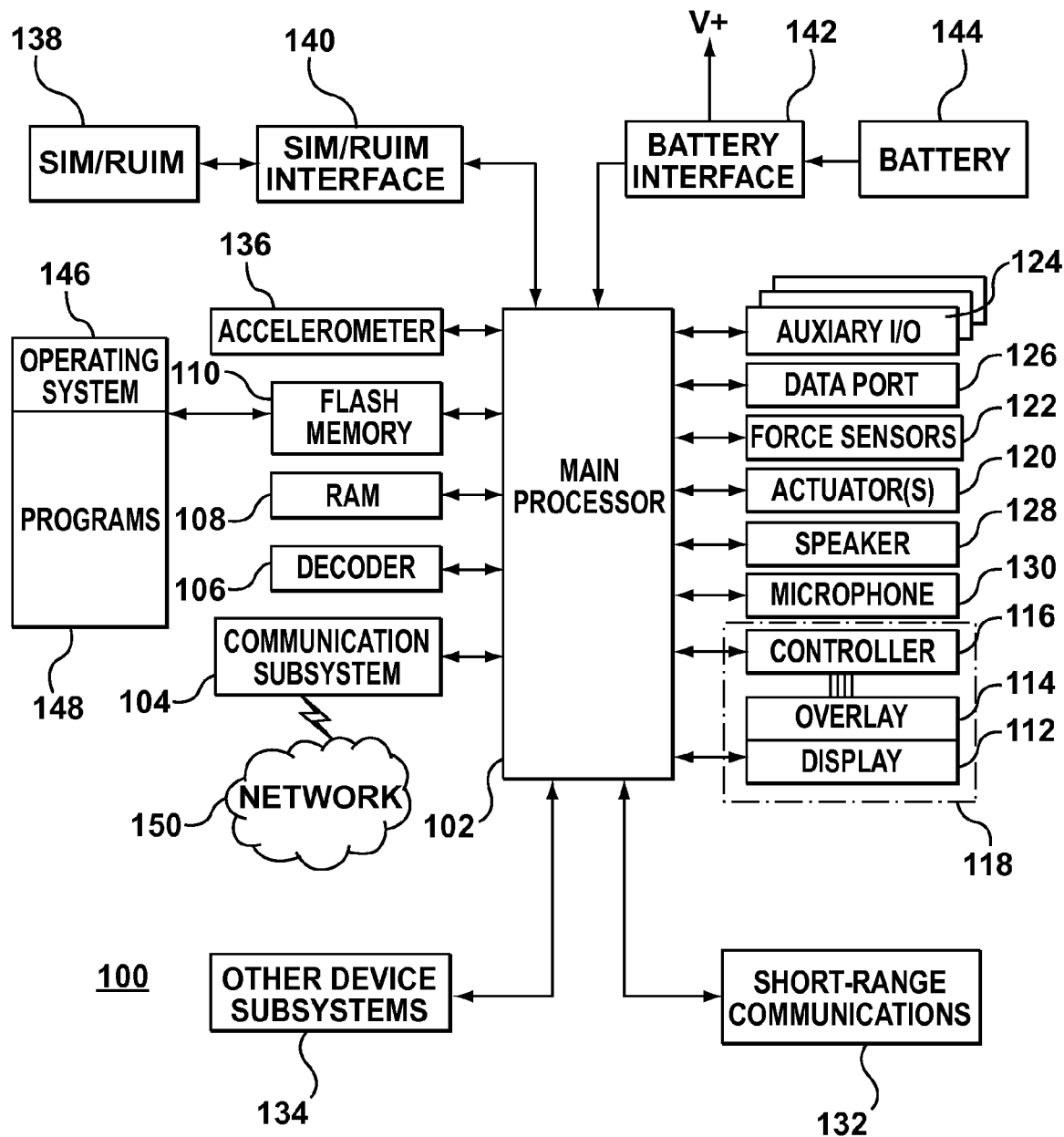
FIG. 1 is a simplified block diagram of components of a portable electronic device.

Described herein are various portable electronic devices that may include a display disposed on a first portion, a keypad disposed on a second portion, and functional components such as a memory and a processor, wherein the second portion is adapted to selectively cover a region of the display on the first portion.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components of a portable electronic device 100. The portable electronic device 100 includes multiple components such as a processor 102 that controls the operations of the portable electronic device 100. Communication functions, including data communications, voice communications, or both may be performed through a communication subsystem 104. Data received by the portable electronic device 100 may be decompressed and decrypted by a decoder 106. The communication subsystem 104 may receive messages from and send messages to a wireless network 150.

The wireless network 150 may be any type of wireless network, including, but not limited to, data-centric wireless networks, voice-centric wireless networks, and dual-mode networks that support both voice and data communications.

The portable electronic device 100 may be a battery-powered device and as shown includes a battery interface 142 for receiving one or more rechargeable batteries 144.

The processor 102 also interacts with additional subsystems such as a Random Access Memory (RAM) 108, a flash memory 110, a display 112 (e.g. with a touch-sensitive overlay 114 connected to an electronic controller 116 that together comprise a touch-sensitive display 118), an actuator assembly 120, one or more optional force sensors 122, an auxiliary input/output (I/O) subsystem 124, a data port 126, a speaker 128, a microphone 130, short-range communications systems 132 and other device subsystems 134.

In some embodiments, user-interaction with the graphical user interface may be performed through the touch-sensitive overlay 114. The processor 102 may interact with the touch-sensitive overlay 114 via the electronic controller 116. Information, such as text, characters, symbols, images, icons, and other items that may be displayed or rendered on a portable electronic device may be displayed on the touch-sensitive display 118 via the processor 102.

The processor 102 may also interact with an accelerometer 136 as shown in FIG. 1. The accelerometer 136 may be utilized for detecting direction of gravitational forces or gravity-induced reaction forces.

To identify a subscriber for network access according to the present embodiment, the portable electronic device 100 may use a Subscriber Identity Module or a Removable User Identity Module (SIM/RUIM) card 138 inserted into a SIM/RUIM interface 140 for communication with a network (such as the wireless network 150). Alternatively, user identification information may be programmed into the flash memory 110 or performed using other techniques.

The portable electronic device 100 also includes an operating system 146 and software components 148 that are executed by the processor 102 and which may be stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, web page download, or other data may be processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104.

For voice communications, the overall operation of the portable electronic device 100 may be similar. The speaker 128 may output audible information converted from electrical signals, and the microphone 130 may convert audible information into electrical signals for processing.

Turning now to FIGS. 2 to 5, illustrated generally therein is a portable electronic device 200 according to one embodiment. The portable electronic device 200 generally includes a first portion (shown here as a display portion 202), and a second portion (shown here as a keypad portion 204). As illustrated, the display portion 202 may include a display 206, while the keypad portion 202 may include a keypad 220 and other input devices 212 (e.g. a trackpad or other navigation device, other input buttons, etc.).

Generally, the display portion 202 and keypad portion 204 are sized and shaped so that the keypad portion 204 can move between a "closed position" wherein the keypad portion 204 covers a particular region of the display 206 on the display portion 202, and an "open position" wherein that particular region of the display 206 on the display portion 202 is exposed.

Figures 4, 5:
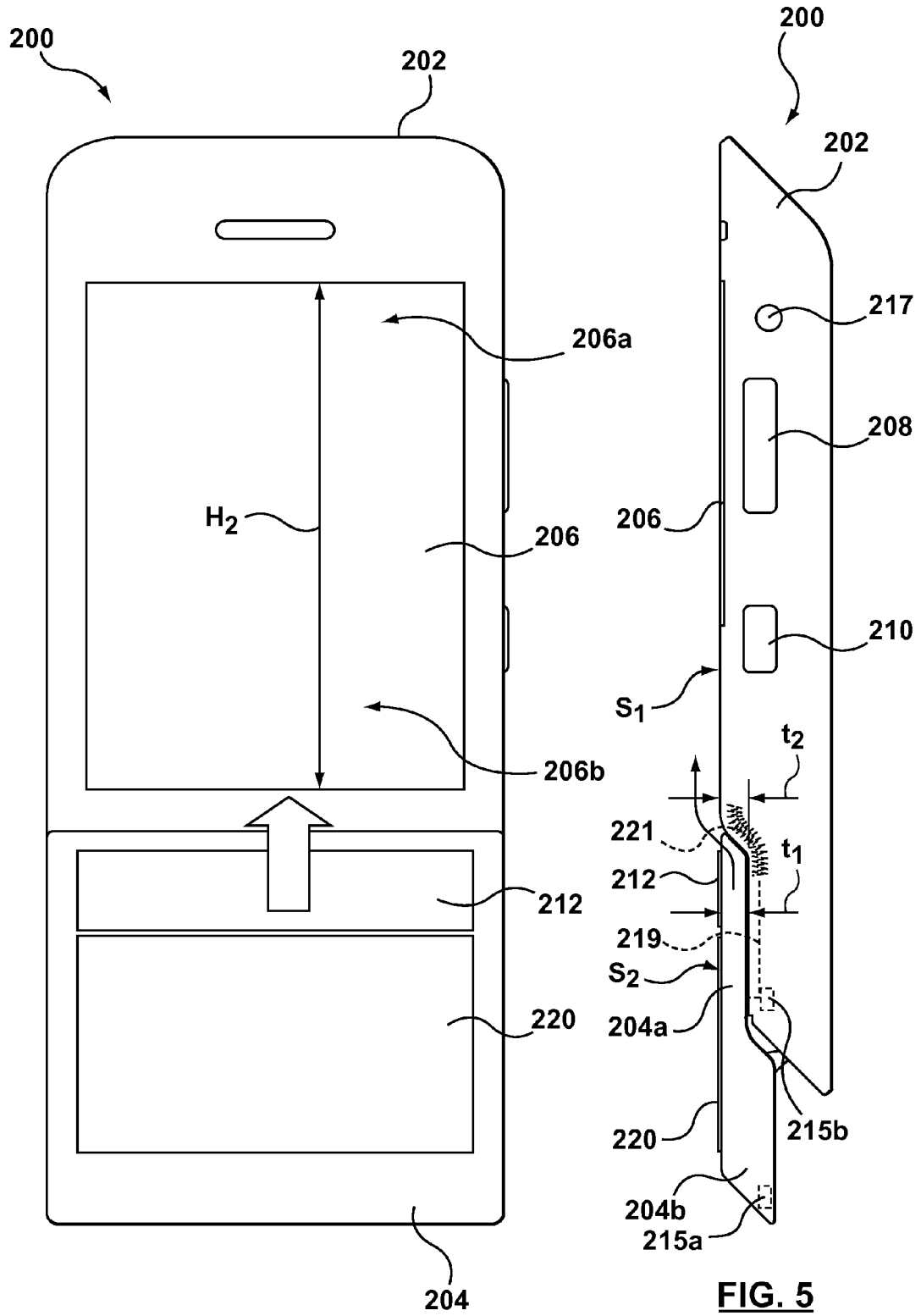
FIG. 4 is a front view of the portable electronic device of FIG. 2 shown in an open position.
FIG. 5 is a side view of the portable electronic device of FIG. 2 shown in the open position.
Figures 6, 7:
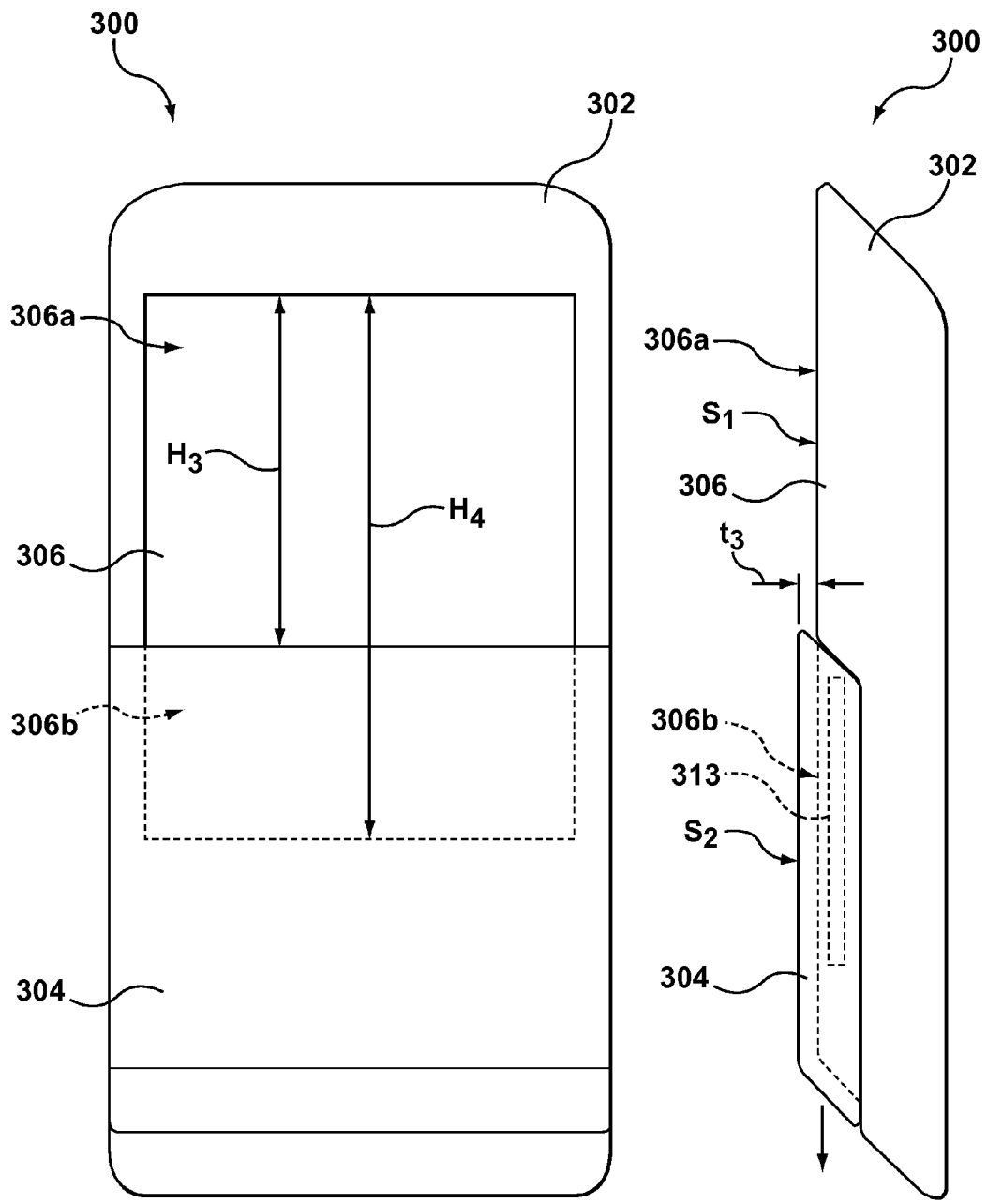
FIG. 6 is a front view of a portable electronic device according to another embodiment shown in a closed position.
FIG. 7 is a side view of the portable electronic device of FIG. 6 shown in the closed position.
Figures 8, 9:
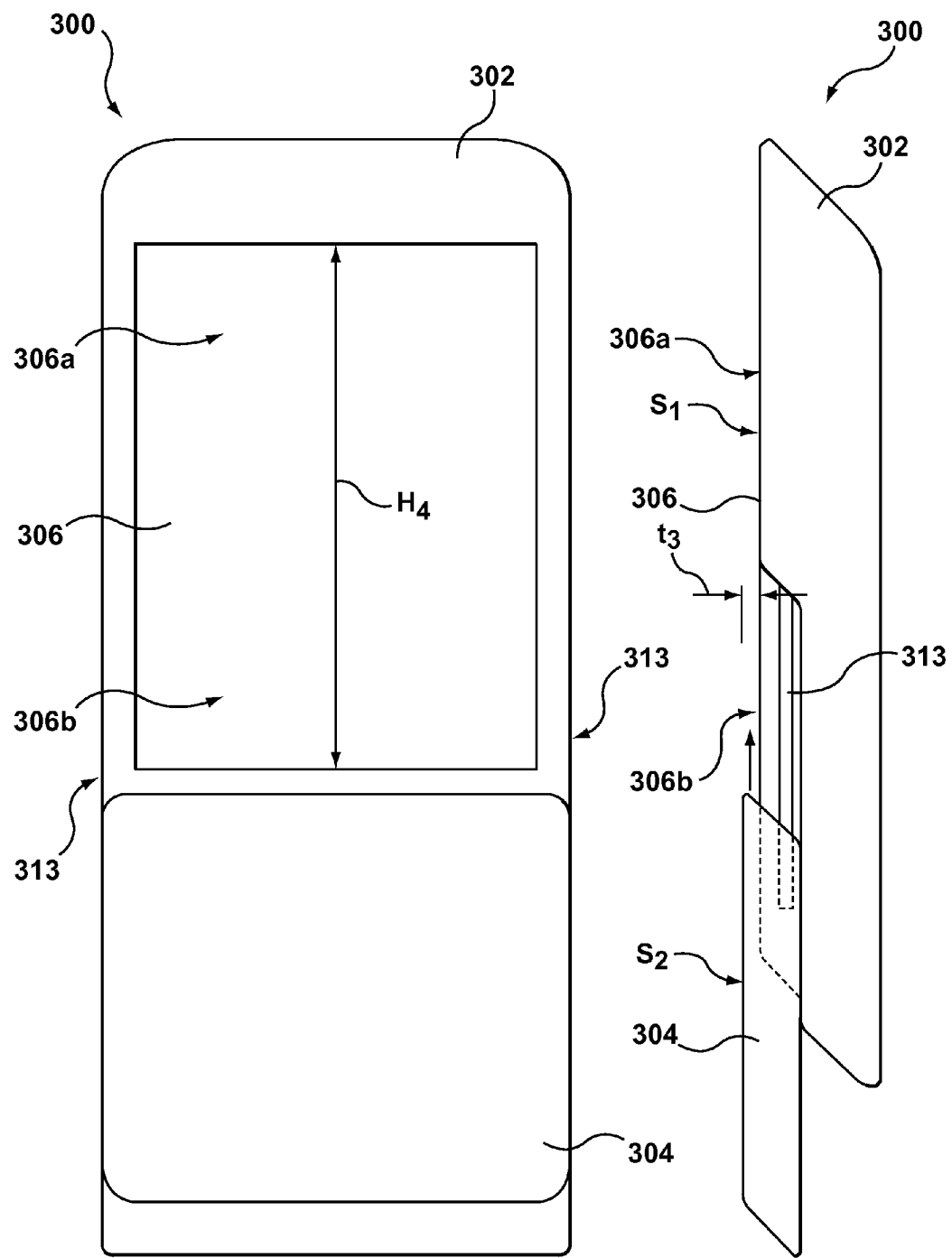
FIG. 8 is a front view of the portable electronic device of FIG. 6 shown in an open position.
FIG. 9 is a side view of the portable electronic device of FIG. 6 shown in the open position.
Figures 10, 11:
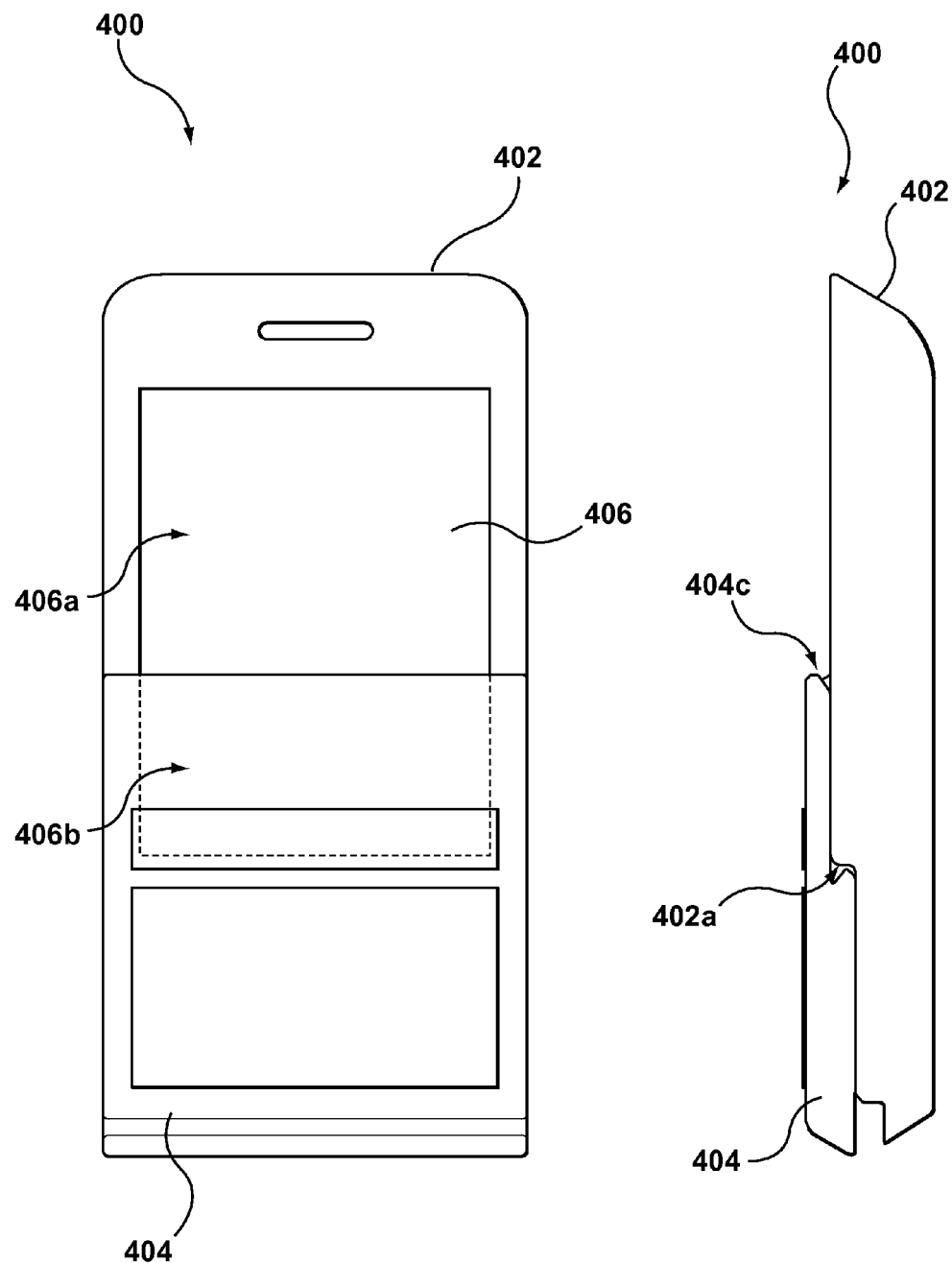
FIG. 10 is a front view of a portable electronic device according to yet another embodiment shown in a closed position.
FIG. 11 is a side view of the portable electronic device of FIG. 10 shown in the closed position.
Figure 14:
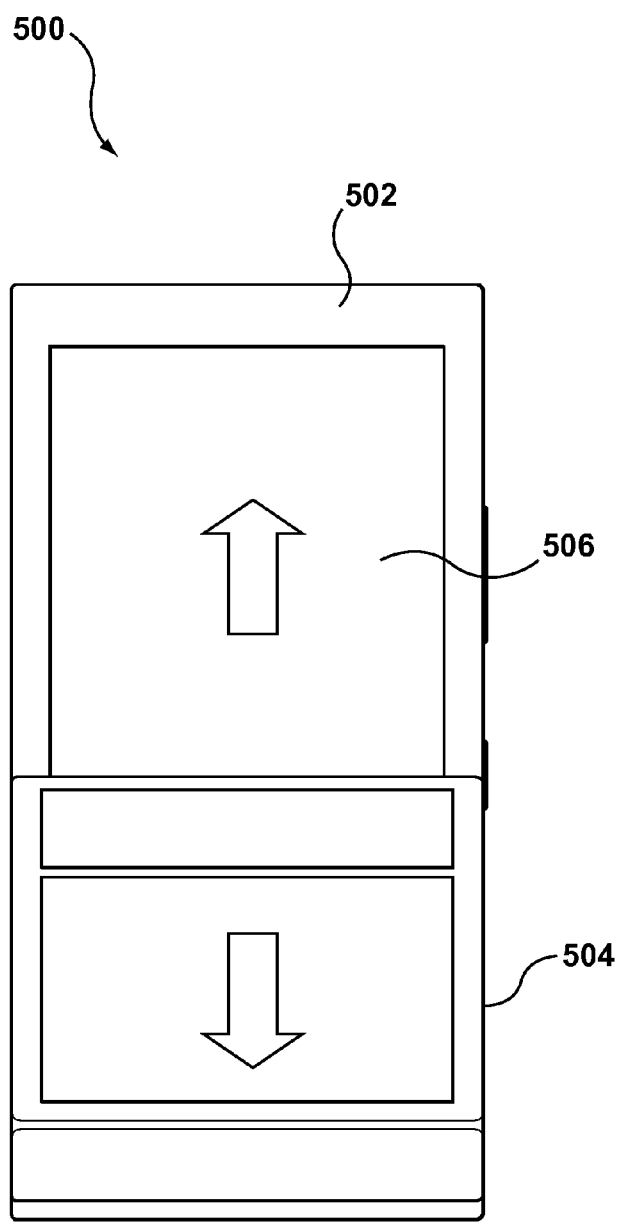
FIG. 14 is a front view of a portable electronic device according to yet another embodiment shown in a closed position.
Figure 15:
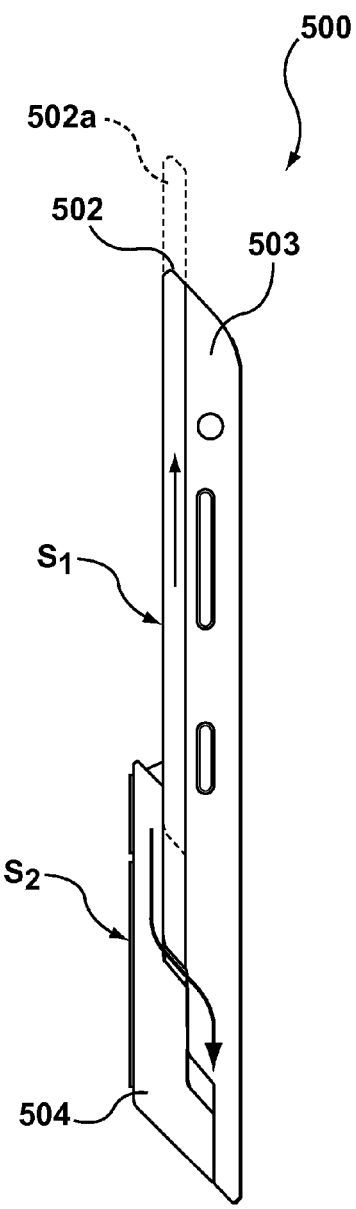
FIG. 15 is a side view of the portable electronic device of FIG. 14 shown in the closed position.
Figures 16, 17:
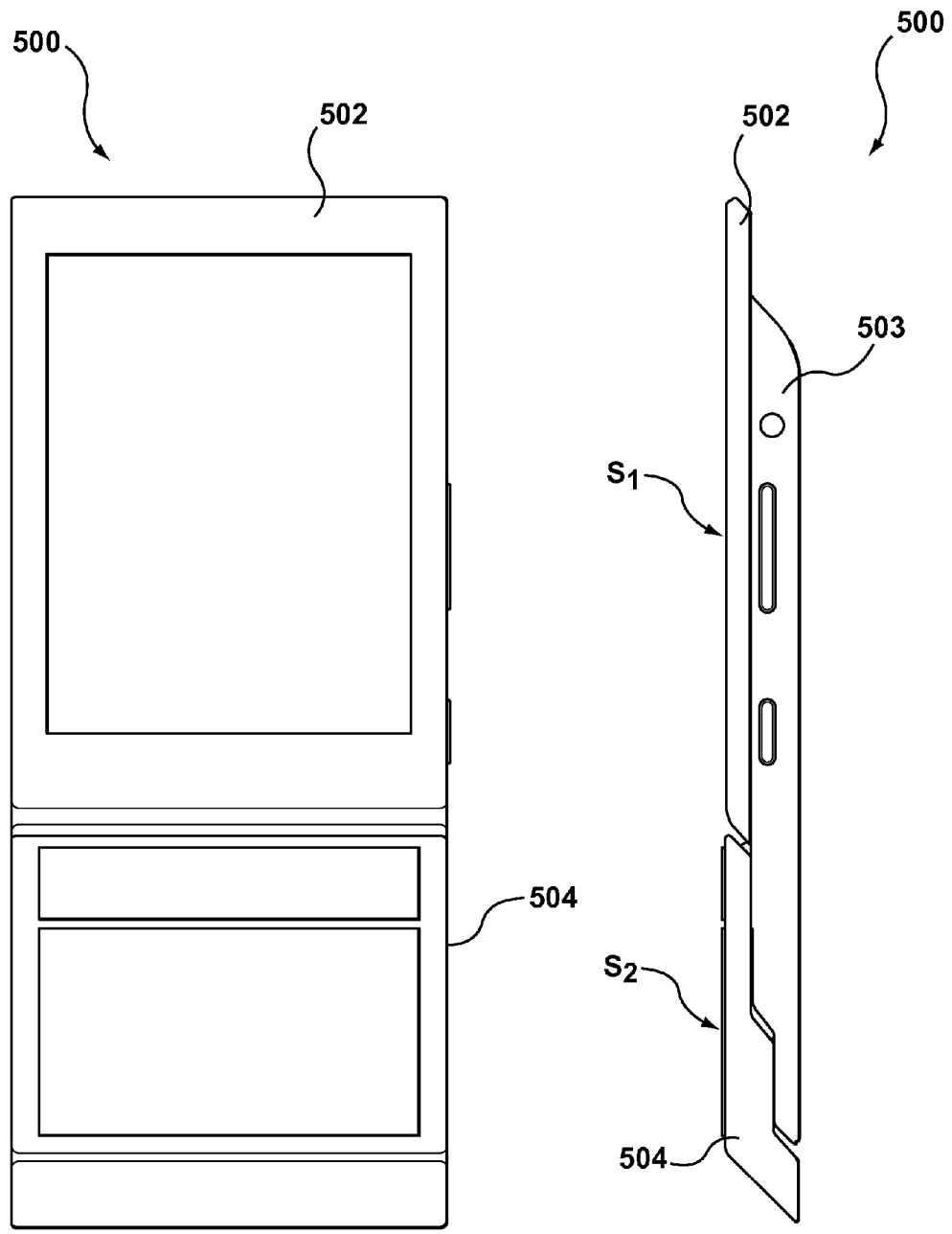
FIG. 16 is a front view of the portable electronic device of FIG. 14 shown in an open position.
FIG. 17 is a side view of the portable electronic device of FIG. 14 shown in the open position.

In particular, as shown in this embodiment the display 206 has a first region 206a (with a height $H_1$) and a second region 206b (with a height $H_2$). When in the closed position (as shown in FIGS. 2 and 3), the first region 206a of the display 206 is exposed, while the keypad portion 204 covers the second region 206b of the display 206 (e.g. the second region 206b is hidden behind the keypad portion 204). However, when the keypad portion 204 is moved to the open position (as shown in FIGS. 4 and 5), both the first region 206a and second region 206b of the display 206 are exposed.

Allowing one or more regions of the display 206 to be selectively exposed may be beneficial for improving the user experience when using the device 200. For example, when a user is using the keypad 220 to compose a message, the user may only want to use a smaller region of the display 206 and accordingly only the first region 206a may be exposed (e.g.

the device 200 can be used while in the closed position). However, the user may want to perform other actions, such as watching a video or browsing the Internet, and may desire to have a larger display 206. Accordingly, the user can move the keypad portion 204 into the open position, exposing the second region 206b of the display 206. This increases the height of the display 206 from $H_1$ to $H_2$ and thus increases the exposed area of the display 206, while still allowing the user to use the keypad portion 204 (e.g. to type a message, and so on).

The slide portion 205 and keypad portion 204 may be slidably coupled together via a slide mechanism, as indicated generally as 219. In some embodiments, the slide mechanism 219 may include interlocking slide rails in the display portion 202 and keypad portion 204. The slide mechanism 219 allows for relative movement between the slide portion 205 and the keypad portion 204 in one direction (e.g. along the longitudinal axis of the device 200) but generally inhibits movement in other directions.

In some embodiments, the slide mechanism 219 may include one or more biasing members (e.g. a spring, such as a compression or extension spring, or another biasing member). The biasing members may be used to encourage the keypad portion 204 to move to one or more of the open position and the closed position. For example, a linear spring 221 in the slide mechanism 219 may be compressed when the portable electronic device 200 is in the closed position (see FIG. 3) and extended when the portable electronic device 200 is in the open position (see FIG. 5).

In some embodiments, when the device 200 is in the closed position, the keypad portion 204 is disposed above the display portion 202 so as to hide the second region 206b. In this position, the surface S2 of the keypad portion 204 is offset from the surface S1 of the display portion 202 by a distance $t_1$.

In some embodiments, as the keypad portion 204 is opened, the surfaces S1 and S2 may be aligned. For example, the slide mechanism 219 may follow the profile 203 of the display portion 202 (with the profile 203 having a recessed region with a depth $t_2$ from the surface S1 of the display portion 202) so that as the keypad portion 204 moves into the open position, the keypad portion 204 "drops" (e.g. moves in a direction normal to the surface S1 of the display portion 202) to align the two surfaces S1 and S2. The depth $t_2$ is generally equal to the offset distance $t_1$ In some embodiments, the shape of the keypad portion 204 may facilitate aligning the surfaces S1 and S2. For example, as shown the keypad portion 204 may include a narrow portion 204a and a wide portion 204b. The narrow and wide portions 204a, 204b are generally complementary to the profile 203 of the display portion 202 (as shown in FIG. 5) so that the surfaces S1 and S2 can be aligned in the open position Aligning the surfaces S1 and S2 when the portable electronic device 200 is open may be beneficial. For example, user interaction with the portable electronic device 200 may be improved as a user may be able to transition from engaging the first surface S1 (e.g. touching the display 206 using a finger) to engaging the second surface S2 (e.g. the input devices 212 or keypad 220) generally without encountering major discontinuities therebetween, such as a lip or stepped portion. This may be particularly beneficial where both the display portion 202 and keypad portion 204 include touch screen elements.

In some embodiments, one or more locks or latches (e.g. mechanical locks, magnets, etc.) may be provided in one or more of the display portion 202 and keypad portion 204 to help secure the portable electronic device in one or more of the closed position and the open position. For example, as shown in FIGS. 3 and 5, magnets 215a, 215b in the keypad portion 204 and display portion 202 (respectively) may attract each other and help retain the device 200 in the closed position, but may not substantially interact with each other when the device 200 is in the open position.

During use, from the closed position (shown in FIG. 2), a user may push downwardly on the keypad portion 204 (e.g. using a thumb or finger) to open the device 200 and expose the second region 206b of the display. When the user wants to move the portable electronic device 200 back to the closed position, the user may push up on the keypad portion 204 to close the device 200 and cover the second region 206b of the device. In some embodiments, movement into one or both of the open and closed position may be facilitated by a spring or other biasing member.

In some embodiments, when in the closed position, the first region 206a of the display 206 may be active (e.g. powered) while the second region 206b will be deactivated. This may help to reduce power consumption of the portable electronic device 200. Accordingly, closing the device 200 may help extend battery life. Furthermore, covering the second region 206b may protect the second region 206b from damage, such as scratches or nicks that could result from carrying the device 200 in a user's pocket or purse, for example.

In some embodiments, the display 206 could be an LCD display with touch screen capabilities. For example, the display 206 could be the display 118 as generally described above. In some instances, both regions 206a, 206b may have touch screen capabilities. In other embodiments, only one of the regions (e.g. the second region 206b) may be a touch screen. In some other embodiments, the display 206 may not be a touch screen display.

The portable electronic device 200 may also include other input apparatus, such as navigation keys or buttons, a physical or virtual keyboard, a trackpad, a trackball, multimedia keys, etc. For example, in this embodiment the keypad portion 204 includes one or more input devices 212, which could include an optical navigation module (e.g. a trackpad), buttons, such as a phone application button, a home screen button, etc. In various embodiments, these input devices may include optical sensors, mechanical buttons, "soft keys", or various combinations thereof.

In this embodiment, the keypad portion 204 includes physical buttons 208 and 210. In some embodiments, buttons 208, 210 could be used for navigation, volume control, or for other purposes. The portable electronic device 200 as shown also includes an audio jack 217, which may be used to couple the portable electronic device 200 to a speaker, a microphone, etc.

The keypad 220 may include a plurality of alphanumeric keys for inputting data into and otherwise controlling the portable electronic device 200. In some embodiments, the keys may represent an alphabet and may be arranged with a standard keyboard layout (e.g. QWERTY, QWERTZ, DVORAK, etc.) or according to other particular patterns. In some embodiments, the keypad 220 could be a physical keypad 220 with mechanical keys. In other embodiments, the keypad 220 could be a touch screen with soft keys.

Turning now to FIGS. 6 to 9, illustrated therein is a portable electronic device 300 according to another embodiment. The portable electronic device 300 is similar to the portable electronic device 200, and includes a first portion (shown here as a display portion 302 including a display 306), and a second portion (shown here as a keypad portion 304 and which could include a keypad or other input devices, or both).

Generally similar to as described above, the display portion 302 and keypad portion 304 are sized and shaped so that the keypad portion 304 can move between a "closed position" wherein the a first region 306a of the display 306 is exposed while the keypad portion 304 covers a second region 306b of the display 306, and an "open position" wherein both the first and second regions 306a, 306b of the display 306 are exposed.

In this embodiment, the keypad portion 304 is slidably coupled to the display portion 302 using a slide mechanism 313 so as to move between the closed position and the open position. In particular, in the closed position the display 306 has an effective height of $H_3$, while in the open position the display 306 has an effective height of $H_4$. Accordingly, a user can move the keypad portion 304 between the open and closed position depending on the desired screen size, and furthermore can use the keypad portion 304 in both the open and closed positions.

In this embodiment however, the keypad portion 304 moves linearly and does not "drop down". Accordingly, the surfaces S1, S2 of the display portion 302 and keypad portion 304 remain offset by an offset distance $t_3$ in both the open and closed positions.

This embodiment may be advantageous as it may provide a user with a tactile sensation when moving between the keypad portion 304 and the display portion 302, which may assist the user in identifying what portion of the device 300 they are contacting. This may be assist in facilitating typing using the keypad portion 304 or the display portion 302 (or both), for example.

As shown, the slide mechanism 313 could include interlocking rails between the display portion 302 and the keypad portion 304 along the sides of the device 300.

Turning now to FIGS. 10 to 13, illustrated therein is a portable electronic device 400 according to yet another embodiment. The portable electronic device 400 is generally similar to the devices 200, 300 as described above and includes a first portion (shown here as a display portion 402 including a display 406), and a second portion (shown here as a keypad portion 404).

Similar to as above, the display portion 402 and keypad portion 404 are sized and shaped so that the keypad portion 404 can move between a "closed position" wherein a first region 406a of the display 406 is exposed while the keypad portion 404 covers a second region 406b of the display 406, and an "open position" wherein both the first and second regions 406a, 406b of the display 406 are exposed.

Furthermore, in this embodiment, the keypad portion 404 may be slidable or otherwise moveable to a first open position (indicated generally as 404a in FIG. 13) wherein the surfaces S3, S4 of the display portion 402 and keypad portion 404 are aligned, similar to the portable electronic device 200 as described above.

However, in this embodiment the keypad portion 404 is also movable into a second open position (indicated generally as 404b in FIG. 13) wherein the surfaces S3, S4 of the display portion 402 and keypad portion 404 are inclined at an offset angle θ. For example, the keypad portion 404 may include a first end 404c adapted to be received in a notch 402a on the display portion 402 so that an abutment 404d on the keypad portion 404 is supported at an angle by a rest portion 402b on the display portion and defines the offset angle θ. Offsetting the surfaces S3 and S4 by an offset angle θ may be advantageous, for example when typing using the keypad portion 404.

In some embodiments, the offset angle θ may be between 5 degrees and 30 degrees. In some embodiments, the offset angle θ may be between 10 degrees and 20 degrees. In some embodiments, the offset angle θ may be approximately 15 degrees.

This embodiment may provide the user with the ability to have a device 400 that operates in multiple positions, namely a closed position wherein the second region 406b is covered, and two open positions: one where the surfaces S3, S4 are aligned (e.g. the first open position 404a), and another where the surfaces S3, S4 are offset by the offset angle θ (e.g. the second open position 404b).

Finally, turning now to FIGS. 14 to 17, illustrated therein is a portable electronic device 500 according to yet another embodiment. The portable electronic device 500 is generally similar to the portable electronic device 200 as described above, and includes a first portion (shown here as a display portion 502 including a display 506) and a second portion (shown here as a keypad portion 504). In this embodiment, the portable electronic device 500 also includes a third portion (shown here as a base portion 503) that is slidably coupled to both the display portion 502 and keypad portion 504.

Accordingly, the keypad portion 504 can move downwards (relative to the base portion 503) to expose a region of the display 506, similar to the portable electronic device 200. However, the display portion 502 may also be moved upwardly relative to the base portion 503 to an extended position (indicated generally as 502a) while the keypad portion 504 is moved downwardly. The movement of both the keypad portion 504 and display portion 502 may cooperate to expose the desired region of the display 506.

Furthermore, movement of the display portion 502 and keypad portion 504 relative to the base portion 503 will allow the keypad portion 504 to "drop down" (similar to device 200) so that the surfaces S1, S2 of the display portion 502 and keypad portion 504 can be aligned.

This embodiment may provide various benefits. For example, since both the display portion 502 and keypad portion 504 can move relative to the base portion 503, the overall size of the device 500 when in the closed position may be relatively smaller, while still allowing for a large display 506 to be provided on the display portion 502 to be provided, particularly when the device is in the open position. This embodiment may also allow the device 500 to be operated in different modes, a "fully closed" mode wherein the display portion 502 and keypad portion 504 are closed, one or more "intermediate" modes, wherein one of the display portion 502 and keypad portion 504 is open or extended and the other is closed, and a "fully open" mode wherein both the display portion 502 and keypad portion 504 are extended. This may be beneficial as it may allow for various operational configurations for the device 500 depending on which mode or state the device 500 is in.

The various embodiments as described herein may provide one or more benefits. For example, some embodiments may provide for a device that can be operated in both a small configuration and a large configuration. In particular, the size of the display on a device may be varied depending on the particular configuration of the device, and generally the effective area of the display may be increased by sliding or otherwise moving a keypad portion so as to uncover more of the display as desired. This may be useful, for example, as it may allow the overall device to be small when closed while still allowing for a large display to be used when open, particularly with a keypad. Furthermore, some embodiments may provide for a smooth transition between the display portion and a keypad portion by dropping the keypad portion to be level or flush with the display portion.

While reference has been made herein to portable electronic devices wherein a first portion is a display portion and a second portion is a keypad portion, this is not meant to be limiting and other configurations are possible. For example, the first portion and second portion may both be touchscreen portions with no keypad. In other examples, the first portion may have a keypad and the second portion may include a display.

While the above description provides examples of one or more processes or apparatuses, it will be appreciated that other processes or apparatuses may be within the scope of the accompanying claims.

The invention claimed is:

1. A portable electronic device, comprising:
a first portion having a display and a first outer surface; and
a second portion having a keypad and a second outer surface and being slidably coupled to the first portion, the second portion having a narrow portion and a wide portion;
wherein the first portion and second portion are sized and shaped so that the second portion can move between:
a closed position, wherein a first region of the display is exposed and a second region of the display is covered by the second portion, and
an open position wherein the first and second regions of the display are exposed, and
a second open position wherein the first and second regions of the display are exposed and in which the first and second outer surfaces are offset by an offset angle;
wherein the first portion has a profile that is complimentary to the narrow and wide portions of the second portion so that as the second portion moves into the open position, the second portion moves in a direction normal to the first outer surface to align the first and second outer surfaces,
wherein the profile of the first portion has a first narrow portion, a second narrow portion more narrow than the first narrow portion, and a wide portion, and
wherein:
when the device is in the closed position, the wide portion of the first portion and the narrow portion of the second portion are in contact and the first narrow portion of the first portion is in contact with the wide portion of the second portion; and
when the device is in the open position, the narrow portion of the second portion is in contact with the first narrow portion of the first portion and the wide portion of the second portion is in contact with the second narrow portion of the first portion,
when the device is in the second open position, the narrow portion and the wide portion of the second portion are in contact with the first narrow portion of the first portion.

2. The portable electronic device of claim 1, wherein the first portion is a display portion.

3. The portable electronic device of claim 1, wherein the second portion is a keypad portion and includes a keypad.

4. The portable electronic device of claim 1, wherein the offset angle is between 5 and 30 degrees.

5. The portable electronic device of claim 1, wherein the first portion and second portion are slidably coupled together using a slide mechanism.

6. The portable electronic device of claim 1, further comprising at least one biasing member for biasing the portable electronic device to at least one of the closed position and the open position.

7. The portable electronic device of claim 6, wherein the at least one biasing member includes at least one spring.

8. The portable electronic device of claim 1, further comprising at least one locking member for securing the portable electronic device in at least one of the closed position and the open position.

9. The portable electronic device of claim 8, wherein the at least one locking member includes at least one magnet.

* * * * *